June 18, 1968 G. F. JONES ET AL 3,389,384

SUPERCONDUCTIVE DIGITAL INFORMATION STORAGE APPARATUS

Filed Dec. 1, 1965

United States Patent Office 3,389,384
Patented June 18, 1968

3,389,384

SUPERCONDUCTIVE DIGITAL INFORMATION STORAGE APPARATUS

Glyn Faulkner Jones and George Richard Hoffman, Sale, England, assignors to National Research Development Corporation, London, England, a British corporation Filed Dec. 1, 1965, Ser. No. 510,792
Claims priority, application Great Britain, Dec. 4, 1964, 49,373/64
9 Claims. (Cl. 340—173.1)

Figures 1, 2:
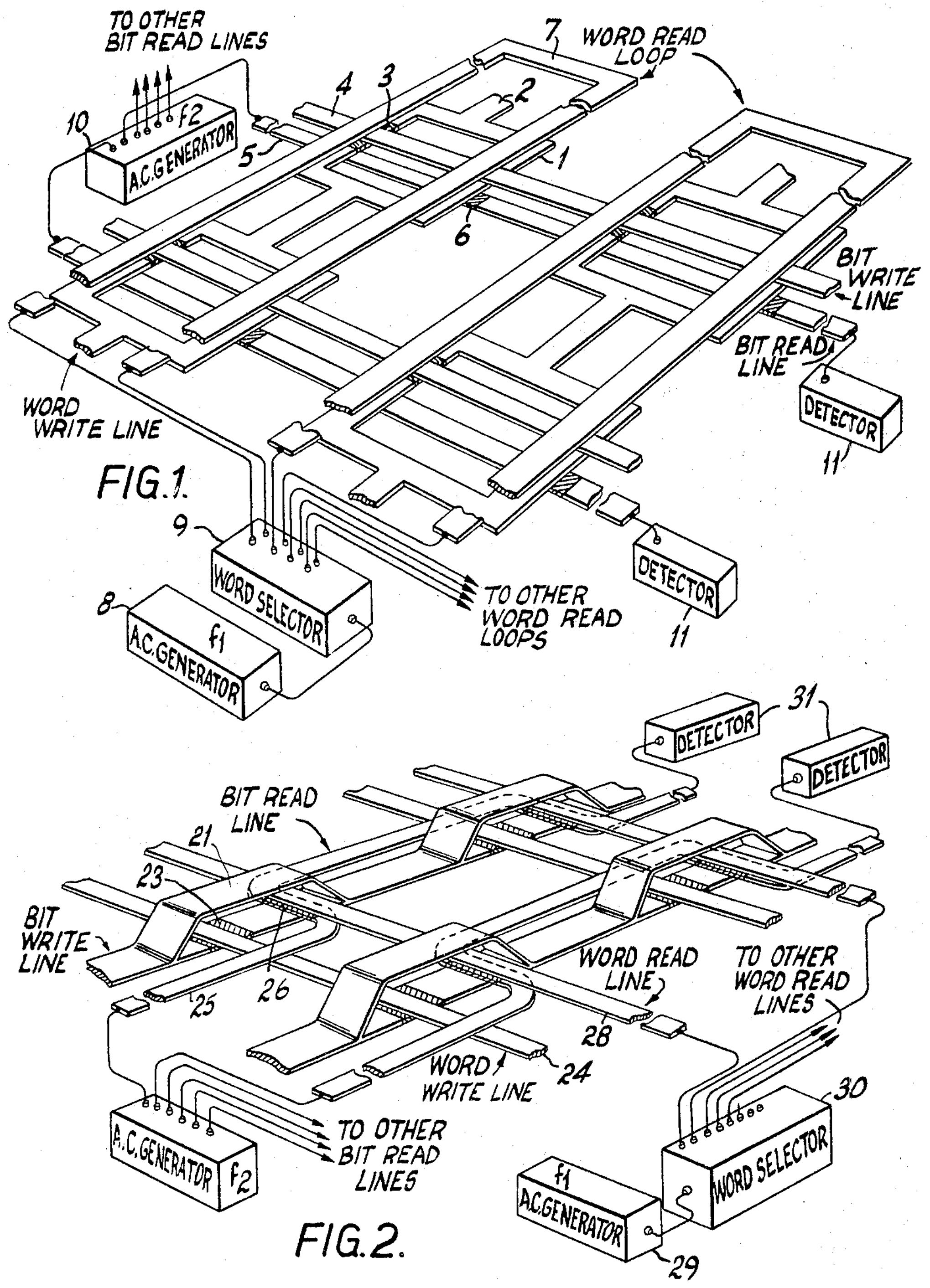

This invention relates to digital information storage apparatus.

Digital information is often stored in binary form in a matrix of two-state elements. One possible form of two-state storage element that has been suggested is a superconducting loop which, since it has zero resistance, can store a circulating current for an indefinite period of time. The two states of the element are: no circulating current, representing a "0," and a circulating current, representing a "1." Alternatively binary digits "0" and "1" can be represented by the direction of circulation of current in an element.

It has been proposed that when it is desired to read stored information the presence of a circulating current in an element be indicated by driving a portion of the element normal (i.e., normally conducting) and measuring the small voltage generated across this portion as the circulating current decays. One difficulty in such measurement is that the transient voltage so generated is extremely small and the read-out is destructive of the stored information. Furthermore for a word-organised store, in which rows or columns of elements are connected in series to form bit lines the voltages that are generated in reading will appear in the bit lines to which therefore highly sensitive untuned amplifiers need to be connected. However proportionately very much higher voltages are applied to the bit lines to write into the store the appropriate circulating currents. Accordingly means will need to be employed to isolate the amplifiers from the writing voltages or sufficient time must be allowed between the writing and reading operations for the amplifier to recover.

It is an object of the present invention to provide digital information storage apparatus using superconducting elements which can be non-destructively read and which isolates the reading facility from the writing facility.

According to the present invention in one aspect digital information storage apparatus comprises a superconducting element arranged to store information in the form of a circulating current and reading means comprising a superconducting gate located in proximity to the element, means for repetitively tending to drive the gate into a normal condition at one frequency so that if the element is carrying circulating current the gate is repetitively driven normal at the one frequency but if the element is not carrying circulating current then the gate remains superconducting, means for applying to the gate a signal alternating at another frequency and a detector sensitive to a derivative of the two frequencies connected to the gate.

According to the present invention in another aspect digital information storage apparatus comprises a plurality of superconducting elements arranged to store information in the form of circulating currents and reading means comprising a plurality of superconducting gates each located in proximity to an element, means for repetitively tending to drive the gates into a normal condition at one frequency so that those gates which are in proximity to elements carrying circulating currents are repetitively driven normally at the one frequency but those gates in proximity to elements not carrying circulating currents remain superconducing, means for applying a signal alternating at another frequency to at least some of the gates and detectors sensitive to a derivative of the two frequencies connected to the gates.

In carrying out the invention selection means may be included for selecting some of the gates for application thereto of the repetitive drive means at the one frequency. Conveniently the superconducting elements and their associated gates are arranged in a matrix of rows and columns and the selection means operates to select a column of gates.

Apparatus embodying the invention can be adapted for word-organized storage, where each column of storage elements forms the location of a different group of digits or "bits" forming a word. In such cases the simultaneous read-out of the bits of a word in a selected column is arranged for by selecting the column of gates which is to be driven normal at the one frequency while at the same time applying the alternating voltage at the other frequency to all the rows of gates so that the bits of the selected word appear at all the detectors simultaneously.

In carrying out the invention the repetitive drive means may comprise a series of conductors each magnetically coupling to all the gates in a column and means for energizing each conductor from an A.C. generator arranged to provide current of a magnitude such that alone it does not generate sufficient flux to drive the gates in a column normal but in combination with a circulating current in an element in proximity to a gate the threshold value of the gate is exceeded and the gate is driven normal. Since the change of state of a gate from superconducting to normal is a non-linear process it will be appreciated that frequencies which are the sum and difference frequencies of the frequency at which a gate is driven normal and the frequency of the voltage or current applied across a gate are generated, and conveniently the detectors are tuned to the difference frequency between these frequencies.

In order that the invention may be more fully understood reference will now be made to the accompanying drawings in which:

FIGURE 1 and FIGURE 2 illustrate alternative embodiments thereof.

Referring now to FIGURE 1 there is shown therein part of a matrix of superconducting elements in the form or rings such as 1 arranged in rows and columns with each column of elements connected together serially to form a word write line 2. Each of the elements 1 includes a gate 3 in one of its arms of a material such as tin, for example, which can be driven normal at a lower value of magnetic flux than the remainder of the element. The gates 3 are controlled by bit write lines 4 which extend in rows across the matrix and are positioned in close proximity to but insulated from the gates 3 in the elements 1.

The matrix thus far described is adapted to have information written into it in a word organized manner. That is the selection of a column in which a word is to be written is effected by passing a substantial current through that column along the word write line 2. The word to be written in, which is in binary digital form, is then applied along all the bit write lines 4 simultaneously; passage of a current along a line 4 representing the writing in of a digit "1" and no passage of current representing the writing in of a digit "0." The effect of the current flowing along any of the bit write lines 4 is to drive the associated gates 3 in that row normal so that the current flowing in the selected word write line flows wholly along one side of the particular element 1 and in doing so generates magnetic flux within the element 1. The currents in the selected bit write lines 4 are then relaxed so that the gates 3 become superconducting and thus any flux within the elements 1 is trapped. On relaxing the drive currents along the word write lines 2 the trapped flux sets up continuously circulating currents in those elements in which the gates 3 were driven normal. It will be appreciated that where no current is applied to a bit write line the associated gates 3 are not driven normal so that the current along the word write line 2 divides equally in both arms of an element if the element has equal inductance in each arm and no resultant flux is generated in an element to set up a persistent circulating current.

To read the information stored in the matrix rows of bit read lines 5 are provided which are located in proximity to the storage elements 1 and each bit read line contains a gate 6 where the bit read line passes close to an element 1. In addition each column of elements is provided with a word read loop 7. These loops form individual half loops each embracing a column of elements and are arranged to be energised by the application of an A.C. current of frequency $f_1$ from an A.C. generator 8. Selection of the word to be read is by means of a word selector 9 which connects A.C. generator 8 to any selected loop 7. The magnitude of the current from generator 8 is adjusted so that while alone it is not sufficient to drive a gate 6 normal, in combination with the flux that may be trapped in one of the circulating elements 1 the resultant flux due to both the circulating current in the element and the alternating current in the associated word read loop 7 is sufficient to repetitively drive gate 6 into a normal condition at the frequency $f_1$. If now a voltage or current at a frequency $f_2$ is applied to any bit read line then if such a line contains a gate 6 which is being repetitively driven normal at the frequency $f_1$ the output from the bit read line will contain derivatives of the frequencies $f_1$ and $f_2$ and in particular will contain the difference frequency between $f_1$ and $f_2$.

Thus to read out a selected word the associated word read loop 7 is energised at frequency $f_1$ and a signal at the frequency $f_2$ derived from an A.C. generator 10 connected to the bit read lines 5 is applied to all the bit read lines. The presence or absence of a signal at the difference frequency at individual detectors 11 connected to each bit read line 5 will then determine whether a 1 or a 0 has been written at a particular location in the selected word. Furthermore it will be appreciated that this reading out is non-destructive in that the circulating current present in any of the elements is maintained.

An alternative embodiment to that illustrated in FIGURE 1 is shown in FIGURE 2. Here the storage elements 21 are in the form of rings in which any trapped flux lies parallel to the substrate. The matrix of rings 21 are in this arrangement connected together in rows which form bit write lines 22. Each of the elements 21 includes a gate 23, which gates are controlled by columns of word write lines 24 extending through all the rings of a column.

The method of writing in information in the arrangement of FIGURE 2 is generally similar to that described with reference to FIGURE 1 except that column selection in which to write a word is by means of the word write lines 24 which control the gates 23 in the elements 21 and bit information is then written in by means of suitable heavy currents fed simultaneously to the selected bit write lines 22 wherein a digit "1" is required.

To read the information stored in the matrix illustrated in FIGURE 2 rows of bit read lines 25 are provided which extend generally parallel to the bit write lines 22 but include gates 26 which lie within the rings 21. The bit read lines 25 are all energised from an A.C. generator 27 which generates a voltage of frequency $f_2$. The gates 26 are controlled by word read lines 28 which extend through all the elements 21 in a column in close proximity to the gates 26. Current at a frequency $f_1$ is applied along the word read line 28 of the selected word that it is desired to read. This current is obtained from an A.C. generator 29 which is switched to the word read line of the selected word by means of a word selector 30.

The magnitude of the current flowing along a read line is such that alone it does not drive the gates 26 of the word normal but the vector sum of the magnetic flux generated by word read line 28 in combination with the flux that is trapped in particular elements 21 in a column is sufficient to repetitively drive those gates 26 normal at a frequency $f_1$. Voltages of a frequency $f_2$ are applied to all the bit read lines 25 and since the repetitive driving normal of the gates 26 of the selected word which are in proximity to elements carrying circulating currents is a non-linear process the signals appearing on detectors 31 connected to the bit read lines 25 will include frequencies derived from the two frequencies $f_1$ and $f_2$ and in particular will include the difference frequency between these frequencies. Detectors 31 are tuned to this difference frequency.

While in both of the described embodiments the gates 6 in FIGURE 1 and the gates 26 in FIGURE 2 are repetitively driven normal by means of currents applied at a frequency $f_1$ it will be appreciated that other means of achieving this object can equally well be used. For example radiant heat may be focussed on to the gates and applied at the frequency $f_1$ by means of light pipes or the like. The magnitude of the heat so applied is adjusted so as to be insufficient in itself to drive the gates normal but is sufficient in combination with any persistent current that is present in the associated loop.

We claim:

1. Digital information storage apparatus comprising a superconducting element arranged to store information in the form of a circulating current and reading means comprising a superconducting gate located in proximity to the element, means for repetitively tending to drive the gate into a normal condition at one frequency so that if the element is carrying circulating current the gate is repetitively driven normal at the one frequency but if the element is not carrying circulating current then the gate remains superconducting, means for applying a signal alternating at another frequency to the gate, and a detector sensitive to a derivative of the two frequencies connected to the gate.

2. Digital information storage apparatus comprising a plurality of superconducting elements arranged to store information in the form of circulating currents and reading means comprising a plurality of superconducting gates each located in proximity to an element, means for repetitively tending to drive the gates into a normal condition at one frequency so that those gates which are in proximity to elements carrying circulating currents are repetitively driven normally at the one frequency but those gates in proximity to elements not carrying circulating currents remain superconducting, means for applying a signal alternating at another frequency to at least some of the gates and detectors sensitive to a derivative of the two frequencies connected to the gates.

3. Apparatus as claimed in claim 2 and including selection means for selecting some of the gates for application thereto of the repetitive drive means of the one frequency.

4. Apparatus as claimed in claim 3 in which the superconducting elements and their associated gates are arranged in a matrix of rows and columns.

5. Apparatus as claimed in claim 4 in which the selection means operates to select a column of gates.

6. Apparatus as claimed in claim 5 in which the gates are connected together in rows.

7. Apparatus as claimed in claim 6 in which an A.C. generator providing a signal at the other frequency is connected to all the rows of gates.

8. Apparatus as claimed in claim 7 in which said detectors sensitive to a derivative of the two frequencies are connected to each individual row of gates.

9. Digital information storage apparatus comprising a matrix of rows and columns of superconducting elements arranged to store information in the form of circulating currents and reading means comprising rows of superconducting gates each located in proximity to an element, repetitive drive means comprising an A.C. generator providing current at one frequency, a plurality of current carrying conductors each located in proximity to a column of elements, selection means for enabling the output of the generator to be switched to a selected one of the conductors, the magnitude of the magnetic flux generated by current from the generator in a selected conductor being sufficient in combination with flux trapped by circulating current in an element to drive the associated gate normal, but being insufficient to drive the gate normal in the absence of trapped flux in an element, means for applying a signal alternating at another frequency to all the rows of gates, and detectors sensitive to the difference between the two frequencies connected to the rows of gates.

No references cited.

BERNARD KONICK, *Primary Examiner.*

J. F. BREIMAYER, *Assistant Examiner.*